United States Patent
Hayashi

Patent Number: 5,096,264
Date of Patent: Mar. 17, 1992

[54] DOUBLE DISK CONSTRUCTION FOR AUTOMOBILE WHEELS OF LIGHT ALLOY

[76] Inventor: Masakazu Hayashi, 5-21, 1-Chome, Takaidanishi, Higashi-Osaka-Shi, Osaka-Fu, Japan

[21] Appl. No.: 564,244

[22] Filed: Aug. 8, 1990

[30] Foreign Application Priority Data

Aug. 31, 1989 [JP] Japan .................................. 1-102780
Apr. 5, 1990 [JP] Japan .................................. 2-11619

[51] Int. Cl.⁵ ............................ B60B 1/14; B60B 3/08
[52] U.S. Cl. ............................. 301/63 DS; 301/9 AN; 301/9 DN
[58] Field of Search ............... 301/9 R, 9 AN, 9 DN, 301/9 DP, 9 SB, 10 R, 11 R, 11 CD, 63 D, 63 DS

[56] References Cited

U.S. PATENT DOCUMENTS

| | | | |
|---|---|---|---|
| 1,675,630 | 7/1928 | Ash | 301/9 SB |
| 1,856,866 | 5/1932 | Feigelson | 301/9 SB |
| 2,176,914 | 10/1939 | Massa | 301/63 DS X |
| 2,193,960 | 3/1940 | Burger | 301/56 |
| 2,275,897 | 3/1942 | Gifford | 301/9 DN X |
| 3,549,205 | 12/1970 | Reid | 301/64 R X |
| 3,649,079 | 3/1972 | English | 301/9 DN |
| 3,834,766 | 9/1974 | Thousand | 301/9 AN X |

FOREIGN PATENT DOCUMENTS

| | | | |
|---|---|---|---|
| 0315897 | 5/1989 | European Pat. Off. | 301/63 DS |
| 3738362 | 6/1989 | Fed. Rep. of Germany . | |
| 4027355 | 11/1990 | Fed. Rep. of Germany . | |
| 259442 | 7/1928 | Italy | 301/63 DS |
| 58-185302 | 10/1983 | Japan . | |
| 22227501 | 12/1984 | Japan . | |
| 0215601 | 8/1989 | Japan | 301/9 R |

*Primary Examiner*—Russell D. Stormer
*Attorney, Agent, or Firm*—Armstrong, Nikaido, Marmelstein, Kubovcik & Murray

[57] ABSTRACT

An automotive vehicle wheel of light alloy including a main disk (21) and a second disk (22) having bosses (25, 46) respectively for attachment to a hub (26) of an axle, peripheral edges (23, 42) for attachment to a rim (R) of the wheel, vent holes (28, 52) formed in intermediate regions (27, 51) between the bosses (25, 46) and the peripheral edges (23, 42) of the disks and an adapter plate (A) for attaching the disks to the hub (26) for rotation as a unit about an axis of rotation (0—0). The adapter plate includes threaded holes provided normal to a conical surface to receive screw clamping devices for securing the disks which extend at an angle ($\theta$) relative to the axis of rotation (0—0).

4 Claims, 12 Drawing Sheets

DOUBLE DISK CONSTRUCTION FOR AUTOMOBILE WHEELS OF LIGHT ALLOY

BACKGROUND OF THE INVENTION

Generally, an automobile wheel of light alloy in the form of an assembly of a wheel disk and a tire supporting wheel rim is known, said wheel disk being interchangeably fitted on the hub of an axle.

It has been common practice to form a number of vent holes in the intermediate region between the boss and the peripheral rib of the wheel disk to distribute them thereover, thereby providing a quasi-wire spoke configuration or other artistic pattern on the surface of the wheel disk.

Such artistically designed pattern has become the selling point for interchangeable wheels, which tend to be manufactured on a diversified small- and medium-quantity production basis.

However, conventional wheel disks used in light alloy wheels for automobiles are of single construction consisting of a single flat disk, as found in Japanese Patent Application Disclosure No. 227501/1984; the artistic patterns formed thereon are lacking in three-dimensional effect and dignity.

That is, in the single construction, in designing said artistic patterns, there is no way but to thicken the disk itself, to bend all or part of the disk or to expose ribs on the surface of the disk. As a result, the resulting artistic design is unavoidably monotonus. Further, in relation to various automobiles having interchangeable wheels mounted thereon, there is a limit to the obtainment of an artistic pattern full of interest and variety, which is expected to be in harmony with the design of the car body.

As for measures to be taken to solve such problems, it wound be contemplated to mount a separate wheel cap on the entire surface of a wheel disk. With such arrangement, however, even if a beautiful artistic pattern can be imparted to the wheel cap, the wheel cap is nothing but an accessory part to the wheel disk, and since it is attached to the wheel disk afterward, it does not add to the strength of the wheel disk itself. Wheel disks are required to have a sufficient strength to support wheel rims.

Thus, I have previously proposed Japanese Patent Application Disclosure No. 185302/1983, wherein the wheel disk is of double construction consisting of a front wall and a rear wall, the opposed walls being integrally cast in spindle form, so that support members for the rear wall can be seen through vent holes distributed over the front wall.

Thus, despite the fact that the wheel disk is made of light alloy, there is an advantage that an artistic pattern depicting a quasi-wire spoke configuration having a three-dimensional dignified effect can be obtained; thus, it serves to solve the above problems to some extent.

However, the wheel disk of said known invention is a one-piece casting of light alloy and in this sense it does not differ much from a wheel disk of a single construction; it cannot be produced by forging or other plastic processing means which are effective for increasing the strength of the wheel disk.

Further, since it is of one-piece construction, once it is produced the artistic pattern of the wheel disk cannot be changed by changing the combination of said front wall and said rear wall; thus, a wheel disk having an artistic pattern full of variety can hardly be manufactured on a diversified small- and medium-quantity production basis.

Not only in Japanese Patent Application Disclosure No. 227501/1984 but also in applicant's Japanese Patent Application Disclosure No. 185302/1983, the boss of the wheel disk is adapted to be attached to the hub of the axle by a plurality of screw clamp devices extending parallel with the wheel rotation axis.

In this respect, it may be said that means for integrally rotatably attaching the boss of a wheel disk to the hub of an axle through a separate adapter plate. However, in this case also, the situation remains unchanged in that the plurality of screw clamping devices for attaching the boss of the wheel disk to the adapter plate still extend parallel with the wheel rotation axis.

Therefore, supposing that the diameter of the wheel disk is constant, the PCD (Pitch Circle Diameter) of the screw clamping devices for attaching the boss to the hub of the axle directly or indirectly through the adapter plate becomes excessively large and correspondingly thereto the boss of the wheel disk has to be given as large a diameter as possible since it needs the strength for attachement.

If so, the intermediate region between the boss and the peripheral rib of the wheel disk is limited in area, with the result that the degree of freedom for providing said artistic pattern in said region is correspondingly limited; thus, the length of quasi-wire spokes forming such artistic pattern is unavoidably decreased.

In the case of the means for attaching the boss of the wheel disk to the hub of the axle directly or indirectly through the adapter plate by screw clamping devices extending parallel with the wheel rotation axis, the horizontal component of an external force imparted from the road to the wheel produces tensile stresses in said screw clamping devices and shearing stresses also in said screw clamping devices; thus, loads acting in all directions cannot be effectively dispersed or absorbed.

As a result, when it is desired to mount wheel on 4WD cars or 4WS cars, it is very difficult to establish a wheel mount state which provides durability and copes with complicated actions required of the wheels for said cars and changes in the direction of external forces on the wheels.

SUMMARY OF THE INVENTION

The present invention has been accomplished to solve such problems.

More particularly, the invention is directed to a wheel disk for automobile wheels of light alloy, and its first object is to provide an arrangement wherein a wheel disk is of split type comprising two parts, a main disk and a sub-disk opposed thereto, said sub-disk being superposed from the front onto the surface of the main disk, whereupon the two disks are integrally attached together at their bosses by a plurality of screw clamping devices and at their peripheral edges by a separate plurality of screw clamping devices so that they are rotatable as a unit, said two disks being put together in such a manner that a space surrounded by three planes respectively containing the intermediate regions of the two disks and the wheel rotation axis is bridged by a three-dimensional truss of substantially triangular cross-section with the plane containing said wheel rotation axis defining one side of the triangle, whereby, unlike a conventional wheel disk of single construction in the form of a flat disk or a conventional wheel cap to be fitted thereon, the wheel disk is given a sufficient strength to function as a support member and the durability thereof is increased.

A second object of the invention is to provide an arrangement wherein the main disk has a number of vent holes in the intermediate region between the boss and the peripheral edge thereof, said vent holes being distributed in a definite artistic pattern, while the sub-disk adapted to be superposed from the front onto the surface of said main disk and attached thereto has its intermediate region formed at its corresponding positions with a number of vent holes which differ from the vent holes of the main disk in size and shape and distribution, whereby coupled with the bridge construction forming said three-dimensional truss, with the result that a three-dimensional dignified artistic pattern creating the impression that the wheel is a wire spoke wheel despite the wheel disk itself being of light alloy manifests itself on the wheel disk.

A third object of the invention is to provide an arrangement wherein the sub-disk prepared as a separate part is superposed from the front onto the surface of the main disk and the two disks are then removably attached together at their bosses by a plurality of screw clamping devices and at their peripheral edges by another plurality of screw clamping devices, so that such main disks and sub-disks can be recombined so as to allow the artistic pattern derived from the two disks to be changed at any time afterward to provide artistic patterns full of variety, the wheel disk being adapted to be manufactured on a diversified small- and medium-quantity production basis.

In that case, in addition to forming the opposed intermediate portions of the two disks with many vent holes different in the shape of the openings and their distribution, the surface of one of the two disks may be left intact to expose the as-cast surface or other non-processed surface while the surface of the other disk may be plated, cut, painted or otherwise processed; thus, by recombination of said disks, the artistic patterns can be made more variegated.

A fourth object of the invention is to provide an arrangement wherein a wheel disk is of split type comprising two parts, a main disk and a sub-disk which are opposed to each other, thus allowing the two disks to be mass-produced not only casting light alloys but also by forging or other plastic processing means which are effective to increase the strength, and facilitating production and providing various configurations in which all or part of the tire supporting wheel rim integrally projects from the main disk or sub-disk.

A fifth object of the invention is to provide an arrangement wherein in the case where a separate adapter plate is interposed between the two disks when the latter are put together and attached to the hub of an axle, the superposed surfaces of said two disks are made in the form of conical tapered surfaces, and a separate plurality of screw clamping devices which extend through the conical tapered surfaces to attach the bosses of the two disks to the adapter plate are inclined so that their axes intersect the wheel rotation axis with their heads directed toward the wheel rotation axis, whereby the PCD of the screw clamping devices is decreased by an amount corresponding to the angle of inclination and hence the diameter of the boss of the sub-disk in the wheel disk can be correspondingly decreased, a fact which means that the intermediate region between the boss and the peripheral edge is given a relatively large area, allowing said artistic pattern to be derived therefrom without limitation, and allowing the quasi-wire spokes to extend longer.

The screw clamping devices in the inclined state ensures that external forces acting horizontally and vertically of the wheel from road are efficiently dispersed or absorbed, so that the wheel disk can be stably and durably mounted on 4WD and 4WS cars whose wheels are required to make complicated movements.

BRIEF DESCRIPTION OF THE DRAWINGS

FIG. 1 is a front view of the wheel;

FIG. 2 is a sectional view taken along the line 2—2 in FIG. 1;

FIG. 3 is a sectional view showing the wheel attached to the hub of an axle;

FIG. 4 is a front view of an adapter plate;

FIG. 5 is a fragmentary perspective view of the adapter plate;

DESCRIPTION OF THE PREFERRED EMBODIMENTS

Figure 1:
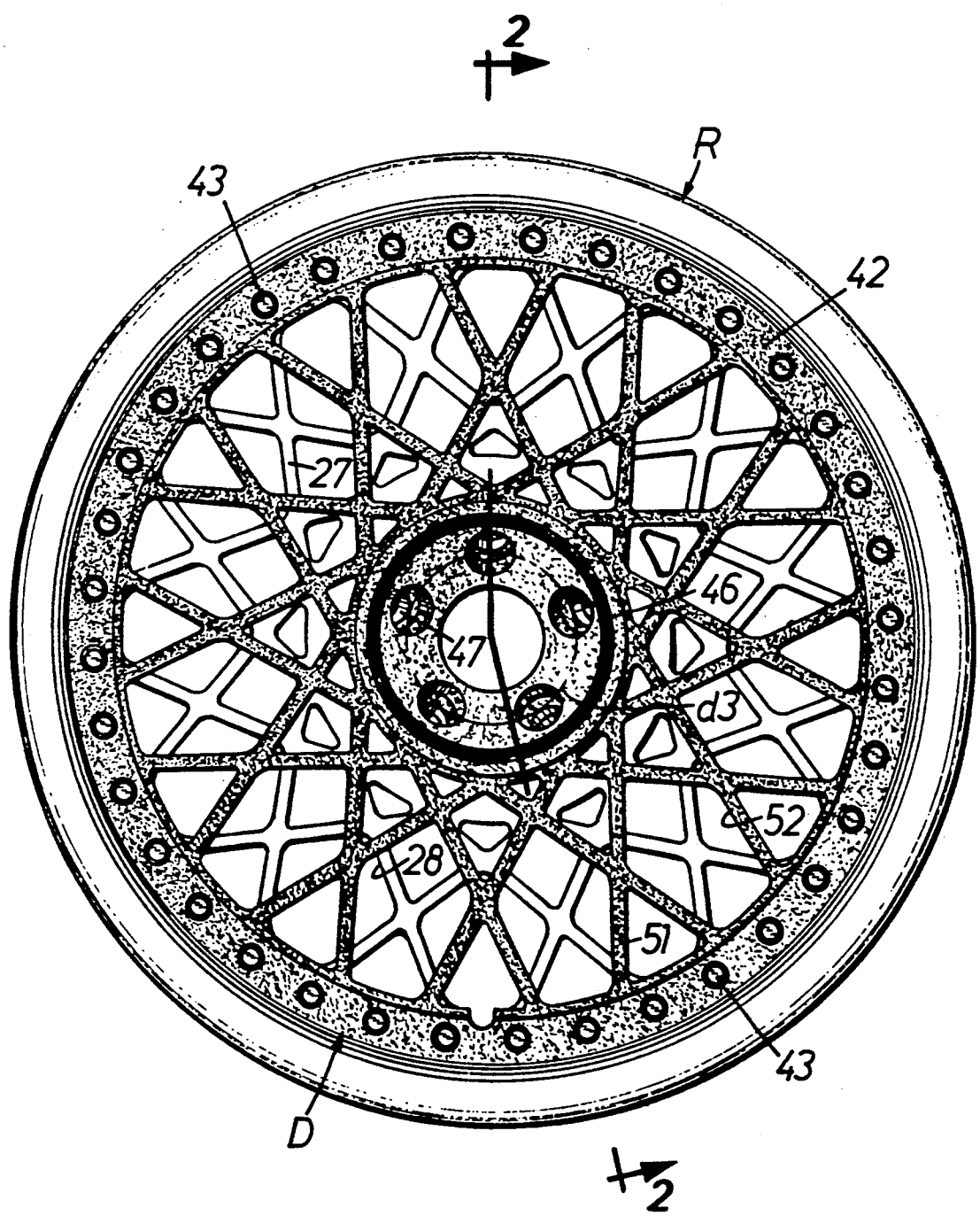
FIGS. 1 through 5 show a basis embodiment of an automobile wheel according to the present invention.

The arrangement of the invention will now be described with reference to the accompanying drawings. FIGS. 1 through 5 show a built-up automobile wheel according to the basis embodiment of the invention. The reference character R denotes a tire supporting rim, and D denotes a wheel disk serving as a support member therefor and consisting of a main disk 21 positioned on the back side (rear side) of the wheel and a sub-disk 22 positioned on the front side (forward side).

The sub-disk 22 is superposed from the front onto the surface of the main disk 21 and they are integrally attached together, thereby forming the wheel disk D of double construction. The wheel disk D has the wheel rim R integrally attached thereto, thereby completing the wheel as a three-piece type automobile wheel.

Speaking of the main disk 21 of the wheel disk D, it is made of alumimum alloy or other metal alloy, preferably by forging or other plastic processing, and its circular peripheral edge 23 of given diameter is formed with a number of threaded holes 24 in radial-line symmetry relation to each other for receiving third screw clamping devices to be later described. The numeral 25 denotes a boss disposed at the center of the main disk and adapted to be removably attached to the hub 26 of an axle for rotation therewith through a separate adapter plate A.

The numeral 27 denotes an intermediate region defined between the boss 25 and peripheral edge 23 of the main disk 21 and formed with a number of vent holes 28 having a given size and shape and distribution, whereby the artistic pattern manifesting themselves on the intermediate region 27 has a quasi-wire spoke configuration as shown in FIG. 1.

That is, the crossing ribs delimiting the vent holes 28 are arranged in mesh configuration creating the impression that the wheel is a wire spoke wheel. However, the artistic pattern is not limited to such quasi-wire spoke configuration.

The adapter plate A is used for interchangeably attaching the wheel disk D to the hub 26 of the axle and it is a circular type having an axle clearing port 29 and is formed of light alloy preferably by forging or other plastic processing. The numeral 30 denotes a plurality of first screw clamping devices for attaching the adapter plate A to the hub 26 of the axle. As is clear from FIG. 3, each device 30 consists of a known stud bolt integrally extending forwardly from the hub and a fixing nut engaged therewith. These devices extend parallel with the wheel rotation axis O—O.

The numeral 31 denotes a plurality (a total of five in the figures) of projections continuously integrally extending from the surface of the adapter plate toward the front (forward) and in radial-line symmetry relation to each other, with a plurality of grooves 32 each defined between adjacent projections 31. Thus, on the surface of the adapter plate A, the projections 31 and grooves 32 alternate with each other.

Figure 3:
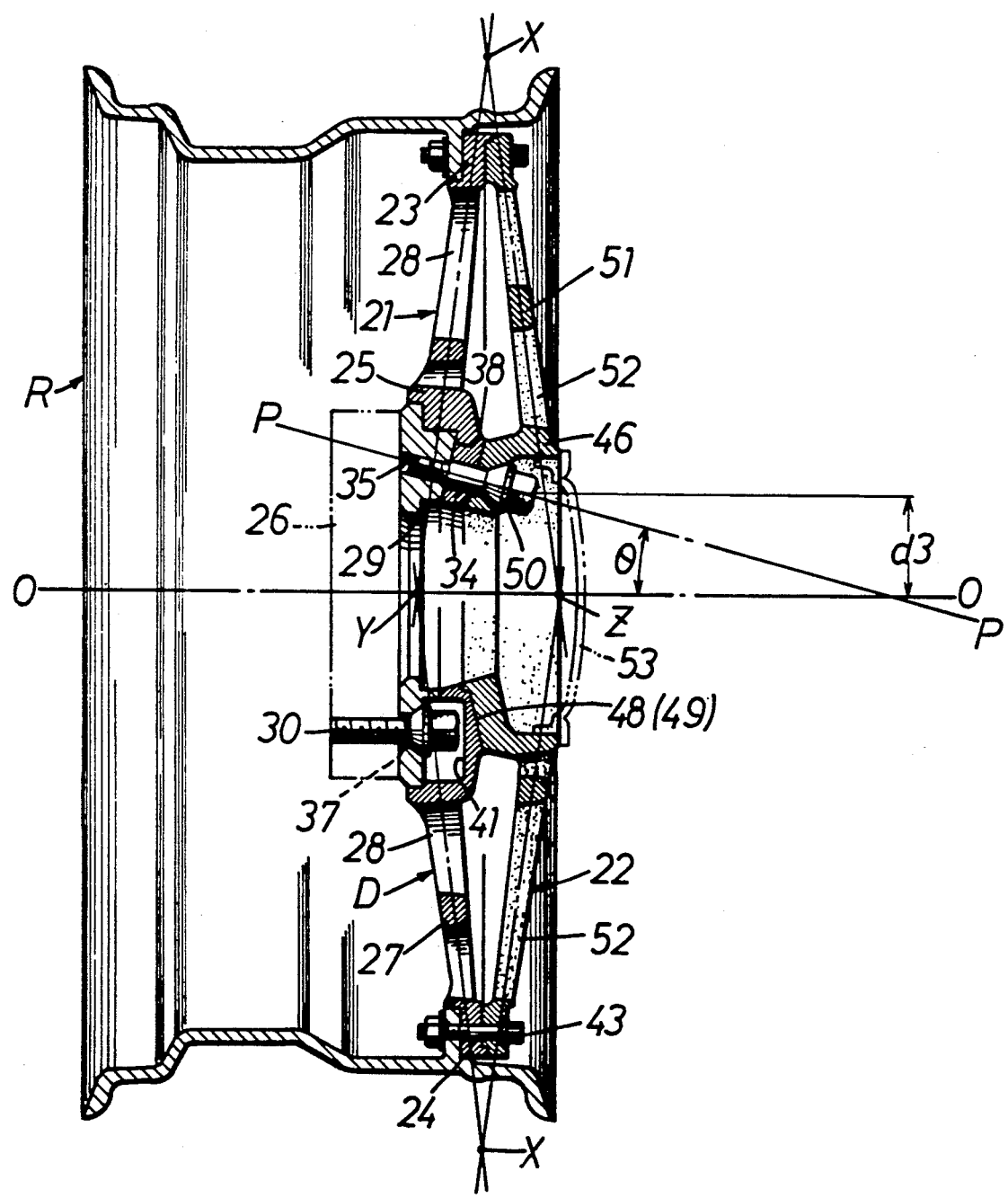
Figure 4:
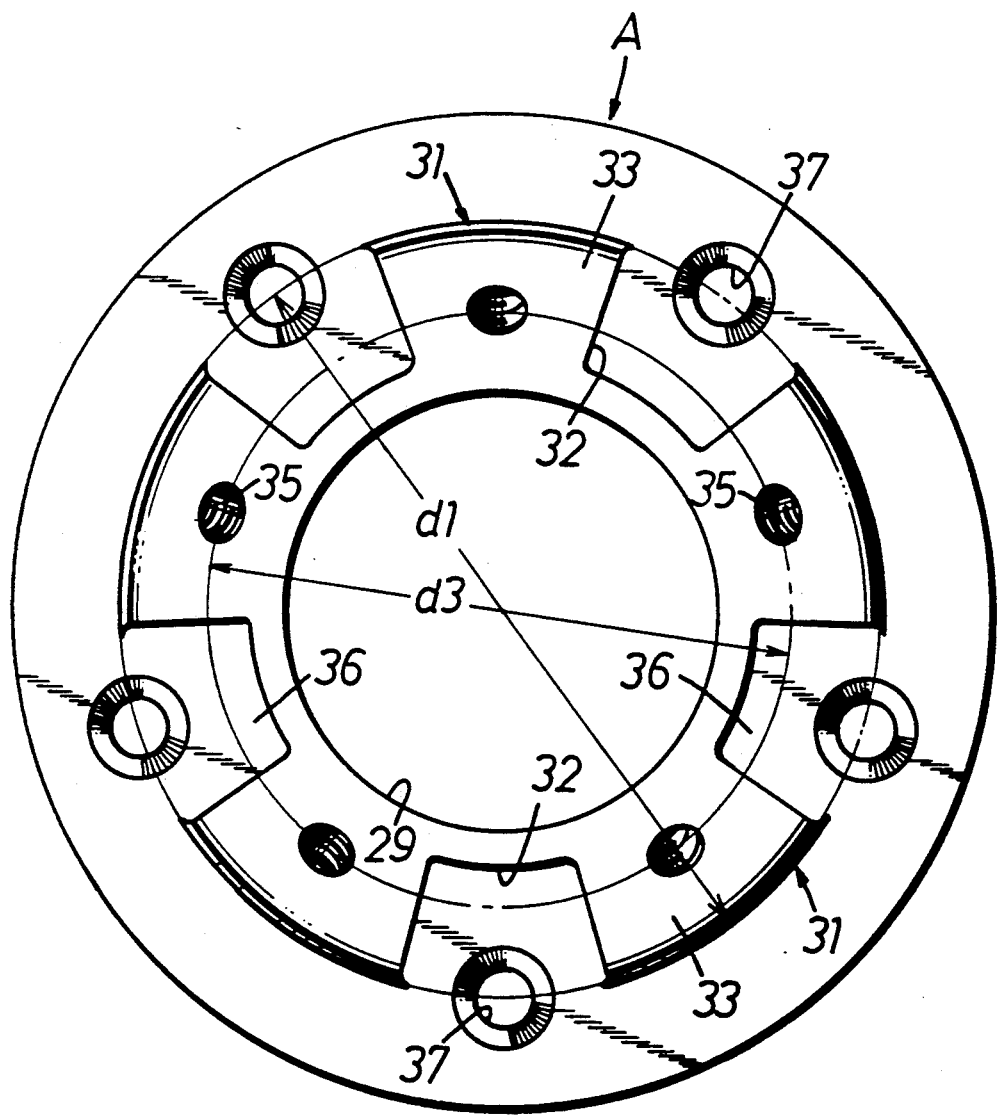
Figure 5:
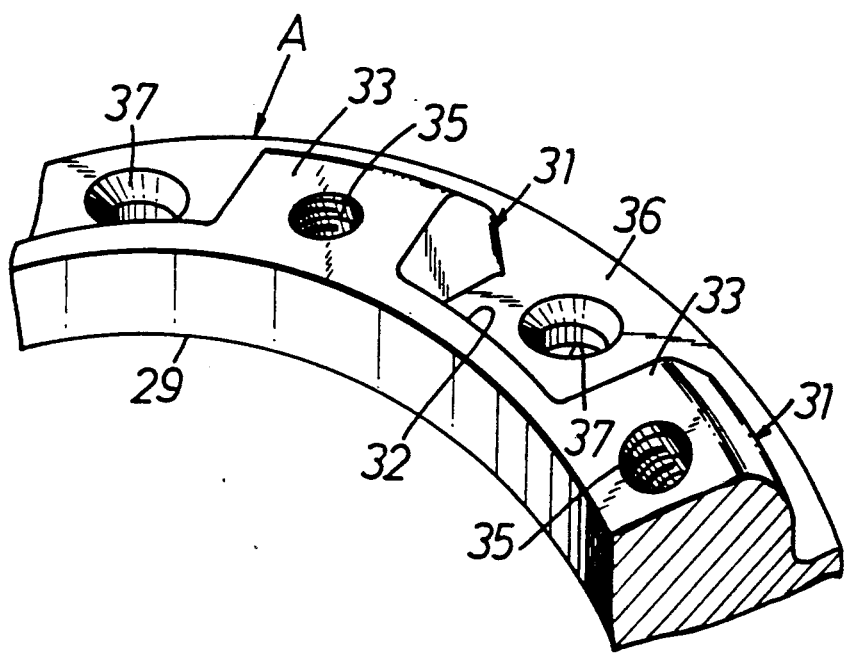

The top surfaces (front surfaces) of the projections 31 are machines to define concave conical slope surfaces 33 flush with each other, and threaded holes 35 for receiving second screw clamping devices 34 are formed at the respective centers of the projections 31 so that they are orthogonal to the associated conical slope surfaces 33. Each of the second screw clamping devices 34 is in the form of a headed bolt, as shown in FIG. 3.

On the other hand, the bottom surfaces of the grooves 32 are non-conical flat surfaces 36 continuous with the surface of the adapter plate A, and holes 37 for receiving first screws clamping devices 30 are formed at the centers of the grooves 32.

Figure 6:
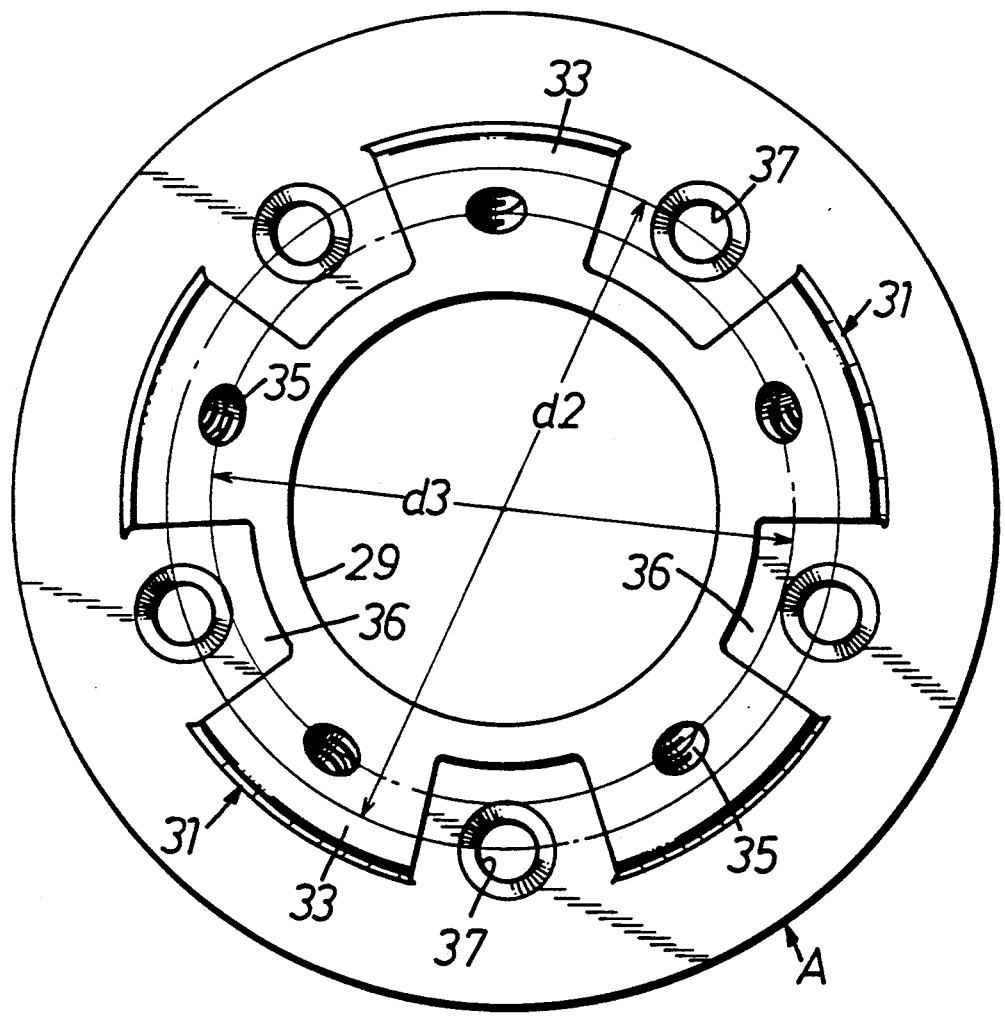
FIG. 6 is a front view of another adapter plate to be used interchangeably with the adapter plate of FIG. 4.

In that case, the PCD (Pitch Circle Diameter) of the holes 37 for receiving first screw clamping devices 30 varies from car maker to car maker and from car type to car type. Thus, as can be suggested from a comparison between FIGS. 4 and 6, several types of adapter plates are prepared including the adapter plate A whose holes 37 for receiving the first screw clamping devices 30 have a large PCD d1, and another adapter plate A whose holes 37 for receiving the first screw clamping devices 30 have a small PCd d2. They are selectively used to attach the wheel disk D indirectly to the hub 26 of the axle.

However, it goes without saying that the threaded holes 35 for receiving the second screw clamping devices 34 have a fixed PCD d3 which is common with all adapter plates A.

With this arrangement, even if the PCD of the first screw clamping devices 30 varies from car maker to car maker and from car type to car type, there is no need to produce and store several types of wheels; it is only necessary to change said adapter plate A and it becomes possible to attach the wheel disk D to the hub 26 of the axle. This arrangement is very useful.

At any rate, the outer peripheral surfaces of the projections 31 extending from the surface of the adapter plate A are superposed and functions as male side fitting surfaces 38, maintaining the intimate contact provided by the spigot joint configuration.

When the adapter plate A has been attached to the hub 26 of the axle, as is clear from FIG. 3, the flat surfaces 36 of the adapter plate A are in a plane orthogonal to the wheel rotation axis O—O, while the concave conical slope surfaces 33 are in a plane crossing the wheel rotation axis O—O at a given angle.

Corresponding to the surface shape of the adapter plate A, the back surface (rear surface) of the main disk 21 is formed with a plurality of convex conical slope surfaces 39 adapted to engage said concave conical slope surfaces 33 of the adaper plate A, said surfaces 39 being in radial-line symmetry relation to each other. Formed through the respective centers of said convex conical slope surfaces 39 are holes 40 for receiving the clamping devices 34 aligned with the threaded holes 35 for receiving the second screw clamping devices 34 in the adapter plate A.

The back surface (rear surface) of the boss 25 of the main disk 21 is formed with notches 41 for receiving the first screw clamping devices 30 at positions corresponding to the grooves 32 of the adapter plate A, said notches alternating with the convex conical slope surfaces 39.

That is, the fixing nuts to be engaged from the front with the stud bolts in the first screw clamping devices 30 are received in said notches 41 of the main disk 21, thereby preventing interference between the back surface of the main disk 21 and the fixing nuts, as shown in FIG. 3.

Speaking of the sub-disk 22 of the wheel disk D, it is made of light alloy by forging or other plastic processing methods and having substantially the same diameter as the main disk 21. The numeral 42 denotes the peripheral edge of the sub-disk 22, where holes 44 are distributively formed for receiving the third screw clamping devices 43 aligned with the threaded holes 24 in the peripheral edge of the main disk 21.

Each of the third screw clamping devices 43 consists of a headed bolt extending parallel with the wheel rotation axis O—O, and a fixing nut engaged therewith. The peripheral edge 23 of the main disk 21, the peripheral edge 42 of the sub-disk 22 and an attaching leg 45 inwardly extending from the wheel rim R are removably attached together.

The numeral 46 denotes a boss forming the center of the sub-disk 22 and formed with holes 47 for receiving the second screw clamping devices 34; it goes without saying that said holes 47 are aligned with the holes 40 for receiving said clamping devices 34.

In that case, the surface of the boss 25 of the main disk 21 is processed to form a concave conical slope surface 48, while the back surface of the boss 46 of the sub-disk 22 is processed to form a convex conical slope surface 49. The boss 46 of the sub-disk 22 is superposed from the front onto the boss 25 of the main disk 21, whereupon they are removably attached together by the second screw clamping devices 34.

That is, as is clear from FIG. 3, the second screw clamping devices 34 each consisting of a headed bolt are passed through the receiving holes 47 of the sub-disk 22 and the receiving holes 40 of the main disk 21 and then screwed into the threaded holes 35 of the adapter plate A. The second screw clamping devices 34 extend orthogonal to the conical slope surfaces 33 and 39 of the adapter plate A and main disk 21 and the conical slope surfaces 48 and 49 of the main disk 21 and sub-disk 22, so that each screw axis P—P cross the wheel rotation axis O—O at a fixed angle $\theta$ with its head assuming the inclined state directed toward the wheel rotation axis.

Therefore, the horizontal and vertical load applied from the road to the wheel can be effectively dispersed or absorbed by the second screw clamping devices 34 in the inclined state. When subjected to a centrifugal force due to the rotation of the wheel, the second screw clamping devices 34 in the inclined state are forced further into the threaded holes 35 of the adapter plate A; thus, there is no danger of them being accidentally loosened.

The numeral 51 denotes the intermediate region between the boss 46 and peripheral edge 42 of the sub-disk 22, said intermediate region being opposed to the intermediate region 27 of the main disk 21 and being formed with a number of vent holes 52 whose size and shape and distribution differ from those of the vent hole 28. Thus, the artistic pattern derived from the intermediate region 51 of the sub-disk 22 differs from the artistic pattern derived from the intermediate region 27 of the main disk 21.

That is, with the quasi-wire spoke configuration taken as an example, the crossing ribs partitioning the vent holes 28 in the main disk 21 on the back side (rear side) can be seen through the vent holes 52 of the sub-disk 22 positioned on the front side (forward side). The pattern of mesh configuration is intentionally changed between the two disks 21 and 22. The artistic pattern to be imparted to the intermediate region 51 of the sub-disk 22 is not limited to the illustrated quasi-wire spoke configuration so long as the artistic pattern changes.

In that case, if either the surface of the intermediate region 27 of the main disk 21 or the surface of the intermediate region 51 of the sub-disk 22 is exposed as a cast surface or other non-processed surface while cutting, paining or otherwise processing the other surface to thereby make these surfaces different from each other in external appearance, the artistic patterns can be further variegated.

Figure 2:
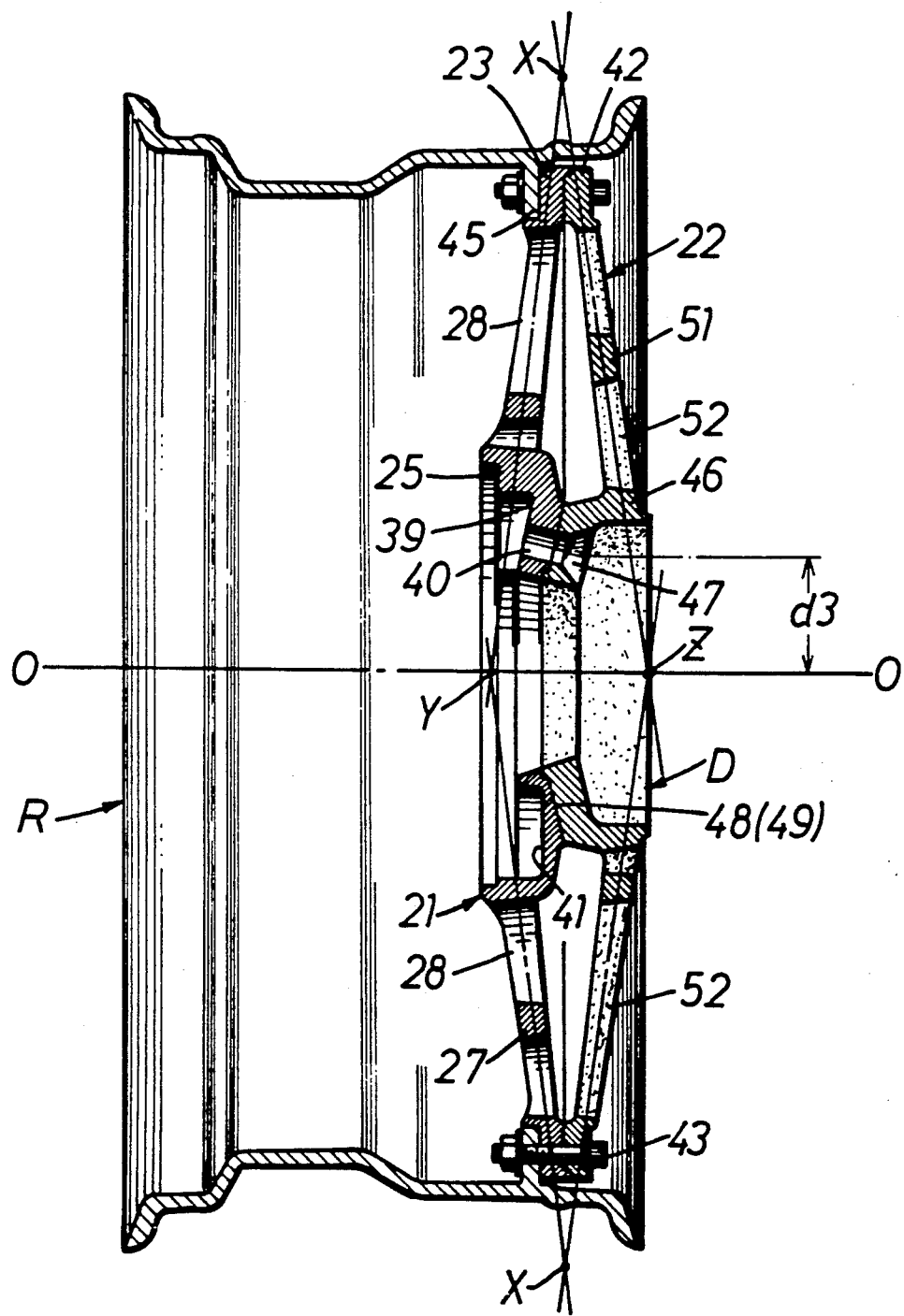

The sub-disk 22 is superposed from the front onto the surface of the main disk 21 and they are attached together at their bosses 46 and 25 by the second screw clamping devices 34 and at their peripheral edges 42 and 23 by the third screw clamping devices 43, as described above. In the attached state, as shown in FIGS. 2 and 3, the space surrounded by the three planes respectively containing the intermediate regions 27 and 51 and wheel rotation axis O—O is bridged by a three-dimensional truss of substantially triangular cross-section with the plane containing the wheel rotation axis defining one side of the triangle.

The apexes of each triangle are marked with X, Y and Z, and as suggested therefrom, a given clearance is secured between the intermediate region 27 of the main disk 21 and the intermediate region 51 of the sub-disk 22. This arrangement in which the two disks 21 and 22 are attached together in the superposed state forming a three-dimensional truss, is effective to increase the strength of the structure and is superior in the three-dimensional effect and dignity derived from the intermediate regions 27 and 51. In addition, the numeral 53 in FIG. 3 denotes a center cap removably fitted from the front to the boss 46 of the sub-disk 22.

In the basic embodiment shown in FIGS. 1 through 5, the tire supporting wheel rim R is formed with the attaching leg 45 extending inwardly therefrom and engaged with the peripheral edge 23 of the main disk 21, and then the third screw clamping devices 43 attaching the peripheral edge 23 of the main disk 21 to the peripheral edge 42 of the sub-disk 22 is utilized to fix the two disks 21 and 22 together. However, the arrangements shown in first through sixth modifications shown in FIGS. 7 through 12 which are different from said basic embodiment may be used so long as the invention is applied to a built-up type automobile wheel in which the wheel rim R is attached to the wheel disk D.

Figure 7:
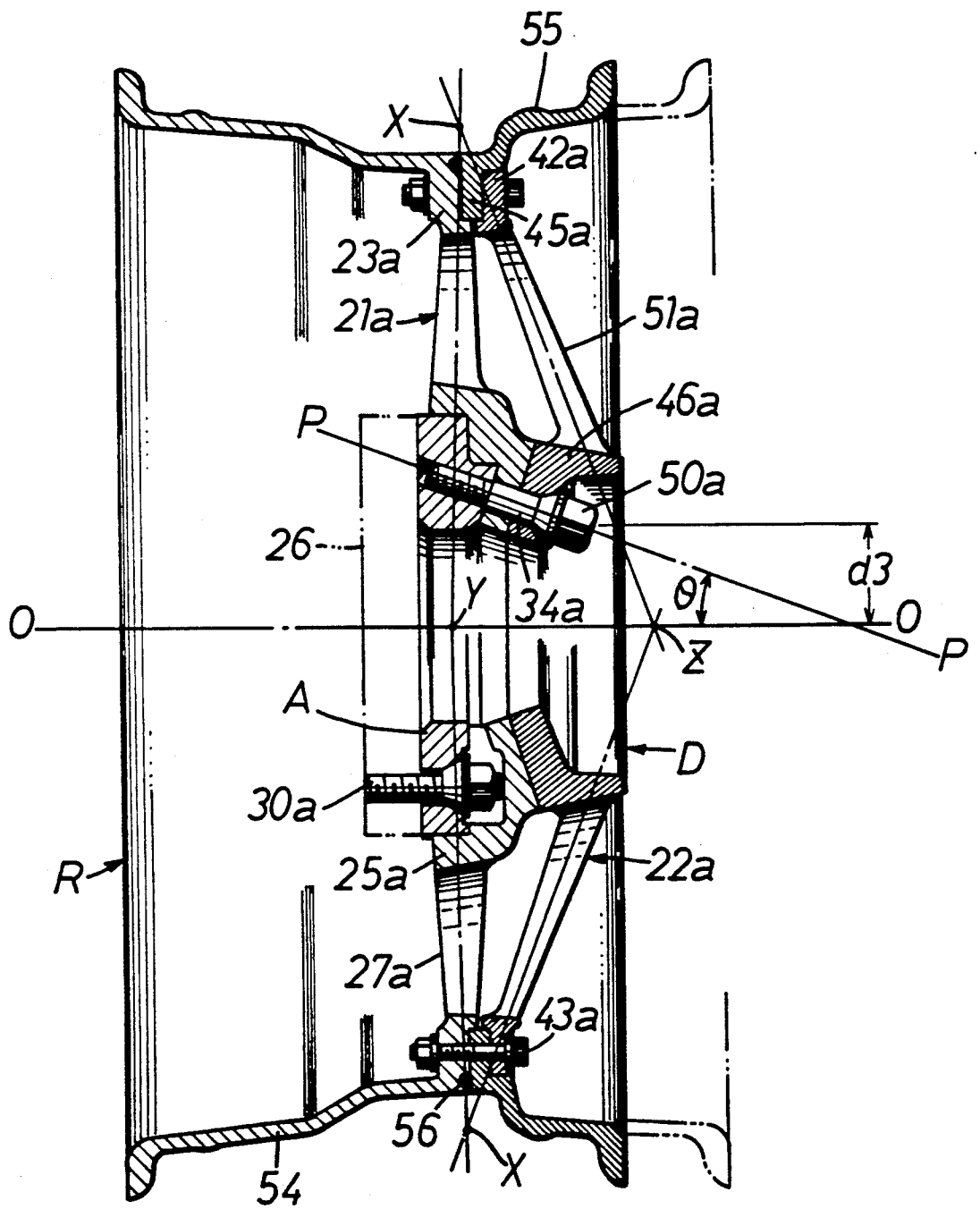
FIG. 7 is a sectional view showing a first modification of an automobile wheel according to the invention.

In the first modification shown in FIG. 7, the rear rim 54 forming the tire supporting wheel rim R continuously extends rearward from the peripheral edge 23a of the main disk 21a, while the inward attaching leg 45a of the front rim 55 which is separate from the rear rim 54 is held between the peripheral edge 23a of the main disk 21a and the peripheral edge 42a of the sub-disk 22a, and in this state the three are removably attached together by the third screw clamping devices 43a.

That is, the three pieces, the main disk 21a integral with the rear rim 54, the sub-disk 22a and the front rim 55, cooperate with each other to form a built up type automobile wheel. The character 56 denotes a seal ring fixed between the front rim 55 and the rear rim 54.

With this arrangement, in changing the amount of offset of the wheel, as suggested by chain lines in FIG. 7, this can be very easily attained simply by exchanging the front rim 55.

Figure 8:
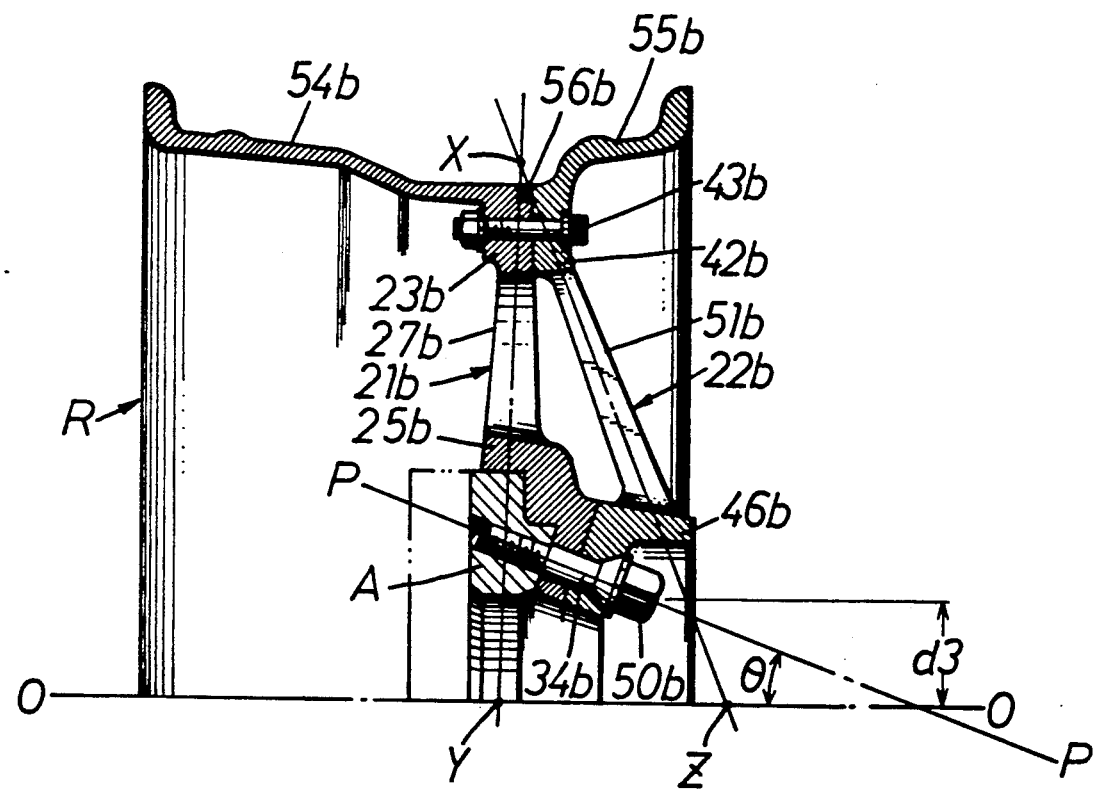
FIGS. 8 through 10 are half-cutaway sectional views showing second through fourth modifications of automobile wheels according to the invention.

In the second modification shown in FIG. 8, the rear rim 54b of the wheel rim R extends rearward from the peripheral edge 23b of the main disk 21b while the front rim 55b continuously integrally extends forward from the peripheral edge 42b of the sub-disk 22b, and the two disks 21b and 22b are removably attached together at their peripheral edges 23a and 42b by the third screw clamping devices 43b; thus, the wheel is made of two pieces.

Figure 9:
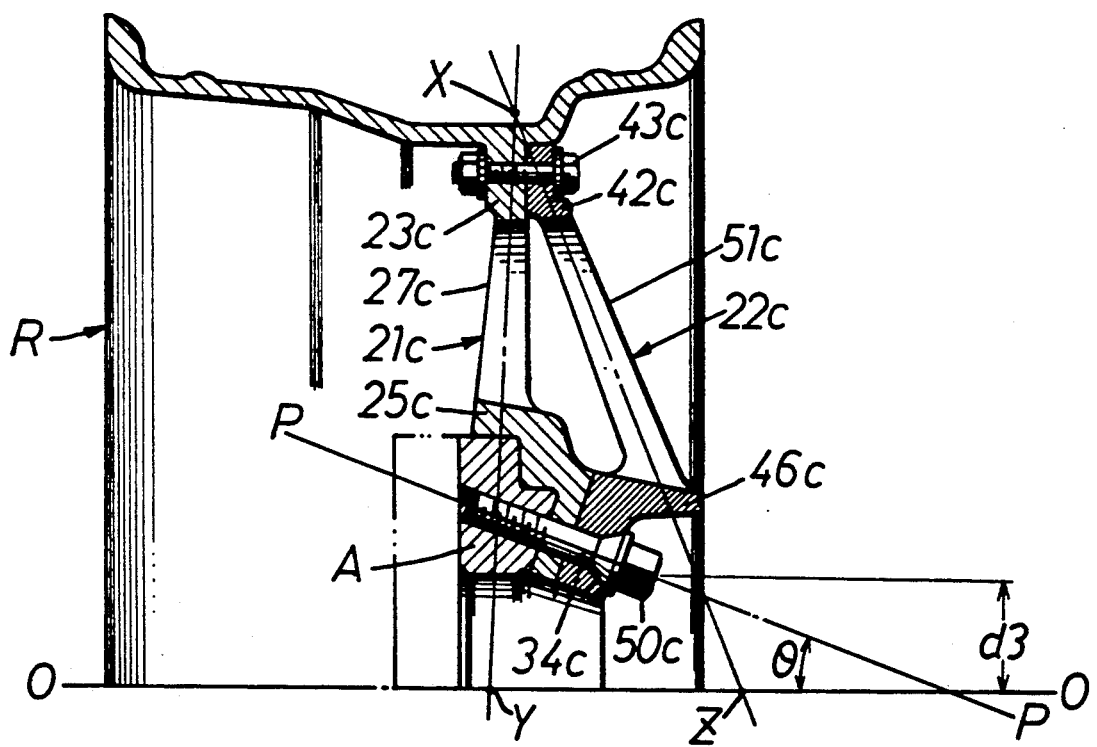

FIG. 9 shows the third modification, wherein the whole of the tire supporting wheel rim R continuously extends from the peripheral edge 23c of the main disk 21c, and the peripheral edge 42c of the sub-disk 22c is engaged from the front with the peripheral edge 23c of the sub-disk 22c, whereupon the two disks are removably attached together at the peripheral edges 23c and 42c also by the third clamping devices 43c. Therefore, in this case also, the wheel is made of two pieces.

Figure 10:
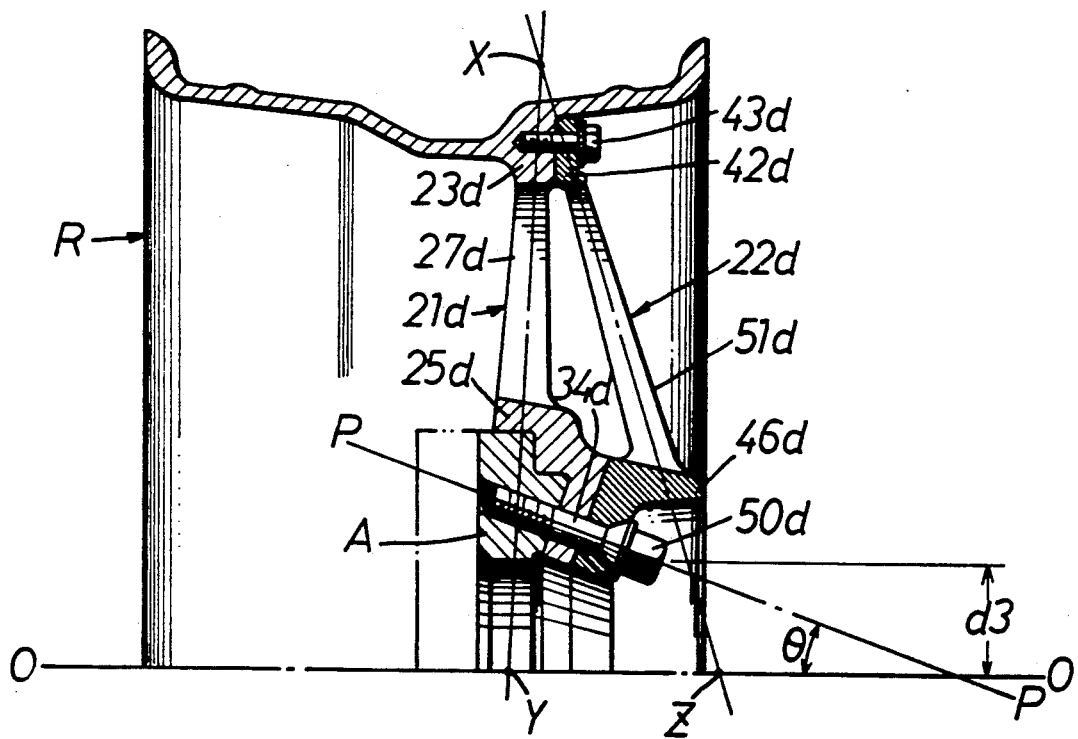

The fourth modification shown in FIG. 10 is partially modified version of the third modification described above, wherein the third screw clamping devices 43d for attaching the two disks 21d and 22d at their peripheral edges 23d and 42d are headed bolts not combined with nuts, said bolts being passed from the front through the sub-disk 22d and screwed into the peripheral edge 23d of the main disk 21d.

Further, in the basic embodiment shown in FIGS. 1 through 5, the second screw clamping devices 34 for attaching the two disk 21 and 22 at their bosses 25 and 46 are inclined such that the screw axis P—P crosses the wheel rotation axis O—O at a given angle $\theta$ with the head 50 directed toward the wheel rotation axis. However, as shown in the fifth modification in FIG. 11, the second screw clamping devices 34e may extend parallel with the wheel rotation axis O—O.

That is, the surfaces of the boss 25e of the main disk 21e to be superposed on the adapter plate A and on the sub-disk 22e are non-conical surfaces which are orthogonal to the wheel rotation axis O—O.

Figure 12:
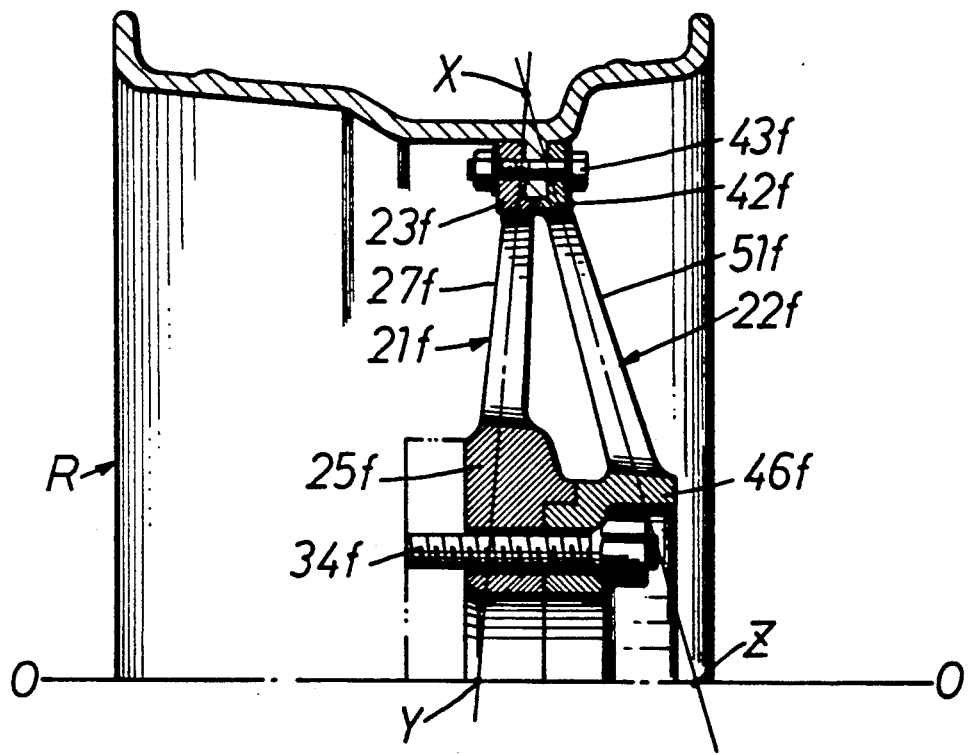

In the sixth modification shown in FIG. 12, the adapter plate A used in the basic embodiment shown in FIGS. 1 through 5 and the first screw clamping devices 30 for attachment to the hub 26 of the axle are omitted, while the second screw claming devices 34f extending parallel with the wheel rotation axis O—O are each composed of a stud bolt set in the hub 26 of the axle to extend forwardly therefrom and a fixing nut engaged therewith, said second screw clamping devices 34f being utilized to attach the two disks 21f and 22f simultaneously to the hub 26 of the axle.

Figure 11:
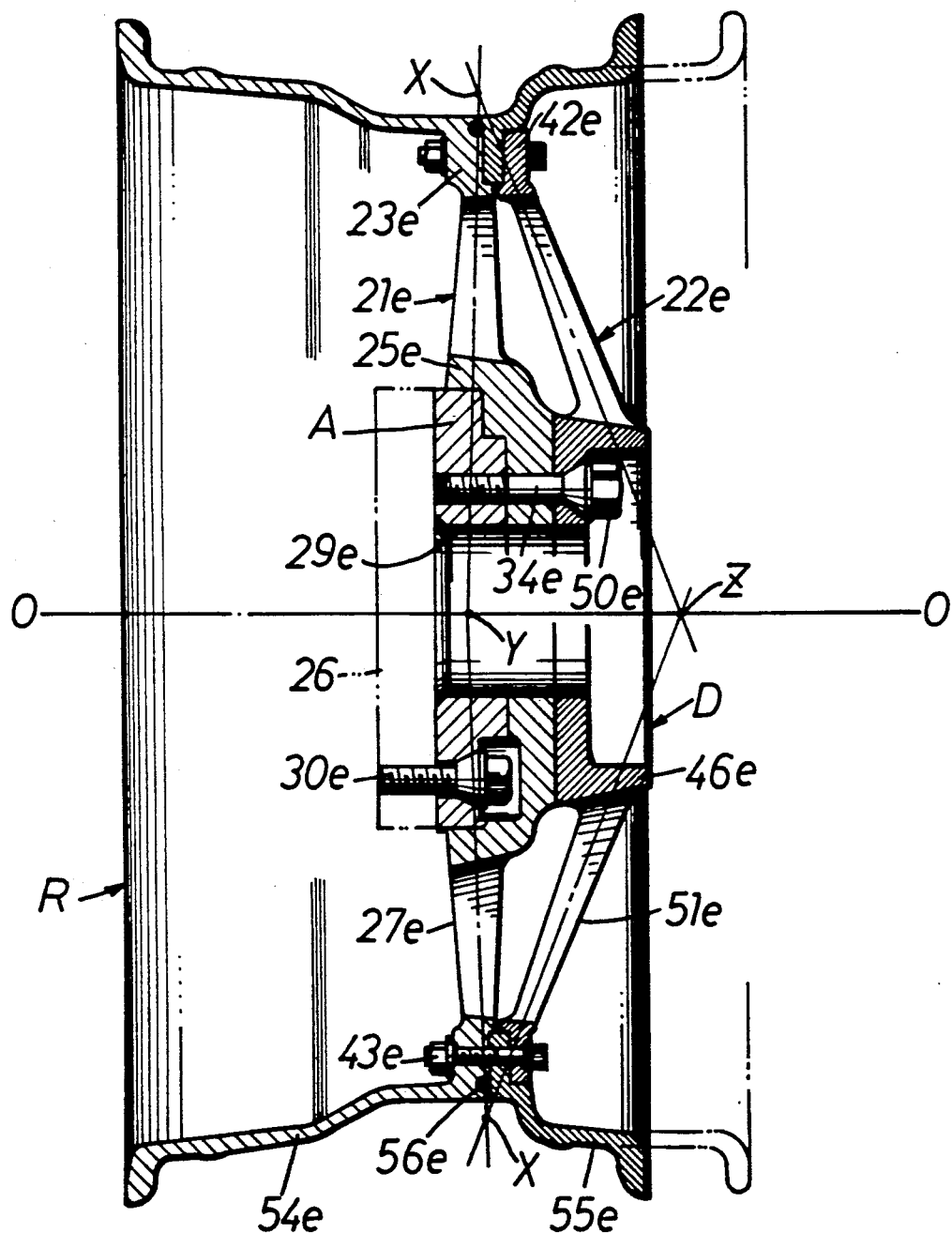
FIGS. 11 and 12 are sectional views showing fifth and sixth modifications.

As in the fifth and sixth modifications shown in FIGS. 1 11 and 12, even if the bosses 25e, 46e, 25f and 46f of the disks 21e, 22e, 21f and 22f are attached to the hub 26 of the axle directly or indirectly through the adapter plate A by the second screw clamping devices 34e and 34f extending parallel with the wheel rotation axis O—O, the intended object of the invention can be attained. However, if the second screw clamping devices 34 are inclined at a given angle θ with respect to the wheel rotation axis O—O with the head 50 directed toward the wheel rotation axis, as is clear from the basic embodiment shown in FIGS. 1 through 5, the PCD d3 of the second screw clamping devices 34 is decreased by the amount by which the head 50 is inclined toward the wheel rotation axis.

As a result, with the diameter of the wheel disk D taken to be constant, the diameter of the boss 46 of the sub-disk 22 in the wheel disk D can be minimized. Despite this minimization, the sufficient strength of attachment to the hug 26 of the axle by the second screw clamping devices 34 can be maintained. Further, the area of the intermediate region 51 is increased by an amount corresponding to the minimization and hence the degree of freedom for imparting said artistic pattern to the intermediate region 51 is increased. For example, there is an effect that the length of the quasi-wire spokes extending from the boss 46 to the peripheral edge 42 can be increased. Such effect can also be attained in the case of the arrangements of the first through fourth modifications shown in FIGS. 7 through 10.

The rest of the arrangement of each of the first through sixth modifications shown in FIGS. 7 through 12 is substantially the same as in the basic embodiment shown in FIGS. 1 through 5; thus, a detailed description thereof is omitted with only alphabetic characters suffixed to the reference numerals used in the basic embodiment.

In brief, in the present invention, sub-disk 22 is formed separate from the main disk 21, and with the sub-disk 22 superposed on the surface of the main disk 21, the space surrounded by three planes respectively containing the intermediate regions 27 and 51 of the opposed two disks 21 and 22 and the wheel rotation axis O—O is bridged by a three-dimensional truss of triangular cross-section, as suggested by the reference characters X, Y and Z. Therefore, there is an effect that unlike the conventional wheel disk of single construction and its accessory wheel cap described at the outset, the strength of the wheel disk D to function as a support member for the wheel rim R can be greatly increased.

Taking part in the attainment of such effect is the fact that the sub-disk 22 and the main disk 21 are fixed together at their bosses 46 and 25 by the second screw clamping devices 34 and at their peripheral edges 42 and 23 by the third screw clamping devices 34. The increase in the strength of the wheel cannot be attained by the wheel cap, which is an accessory part to be attached afterward.

Furthermore, the wheel disk D of the present invention is of double construction, and because of the three-dimensional truss of triangular cross-section, a beautiful artistic pattern full of the three-dimensional effect and dignity of a wire spoke wheel can be derived from the intermediate regions 27 and 51 of the two disks 21 and 22 despite the fact that the wheel disk is made of light alloy.

Particularly, the intermediate regions 27 and 51 of the two disks 21 and 22 are formed with a number of vent holes 28 and 52, respectively, differing in size and shape and distribution, and the sub-disk 22 and main disk 21 are removably attached together by the second and third screw clamping devices 34 and 43. Therefore, by preparing various main disks 21 and sub-disks 22 differing in artistic pattern provided by the vent holes 28 and 52 and recombining the pair afterward, it is possible to enrich the variety of artistic pattern exhibited on the surface of the wheel and it becomes easier to harmonize the artistic design with the design of the car body.

Further, since the main disk 21 and the sub-disk 22 are independent of each other and cooperate with each other to form the wheel disk D of double construction when attached together, they can be produced of light alloy by casting and also by forging and other plastic processing means which are advantageous for increasing the strength. Further, as is suggested from the basic embodiment and the first through sixth modifications, the wheel disk can be formed to be continuous and integral with all or part of the tire supporting wheel rim R without any trouble. In this respect also, the invention is very useful for manufacture of interchangeable wheels on a diversified small-and medium-quantity basis.

What is claimed is:

1. An automotive vehicle wheel or light alloy including
a main disk (21) and a second disk (22) having bosses (25, 46) respectively for attachment to a hub (26) of an axle,
peripheral edges (23, 42) for attachment to a rim (R) of the wheel, and means (43) for securing said peripheral edges (23, 42) to the rim (R);
vent holes (28, 52) formed in intermediate regions (27, 51) between the bosses (25, 46) and the peripheral edges (23, 42) of the main disk (21) and the second disk (22), respectively, and
an adapter plate (A) for attaching said main disk (21) and said second disk (22) to the hub (26) for rotation as a unit about an axis of rotation (O-O) wherein the improvement comprises:
an adapter plate having one surface formed with at least one radially extending flat surface (36) and at least one inclined conical surface (33),
a plurality of holes (37) provided for attaching said adapter plate to an axle hub (26) with each of said holes (37) located in said flat surface (36) and extending normal to said flat surface (36) to receive a plurality of screw clamping devices (30) extending parallel with said axis of rotation (O-O),
a plurality of threaded holes (35) provided to said adapter plate for attaching said main disk and said second disk with each of said threaded holes (35) located in said inclined conical surface (33) and extending normal to said conical surface,
said boss (25) of said main disk (21) being formed with opposed conical surfaces (39, 48) with one of said conical surfaces (39) having the same conical angle as the inclined conical surface (33),
said boss (46) of said second disk (22) being formed with a conical surface (49) having the same conical angle as the inclined conical surface (48), a plurality of holes (40, 47) are formed through said conical surfaces (39, 48) of said boss (25) and said conical surface (49) of said boss (46), said boss (46) of said second disk (22) is superposed on said boss (25) of said main disk (21) with said conical surface (49) abutting said conical surface (48), said boss (25) of said main disk (21) is superposed on said adapter plate (A) with said conical surface (39) abutting said inclined conical surface (33), and a second plurality of screw clamping devices (34) extend through said holes (40, 47) and are secured in said threaded holes (35) to attach said bosses (25, 46) of said main disk (21) and said second disk (22) to said adapter plate (A) with an extension of the respective axis (P-P) of each clamping device (34) intersecting said axis of rotation (O-O) at an angle ($\theta$) and with heads (50) of said clamping devices (34) directed toward said axis of rotation (O-O).

2. The automotive vehicle wheel defined by claim 1, wherein, said one surface of said adapter plate is formed with a plurality of radially extending flat surfaces (36) and a plurality of projections (31) with each projection (31) located between a pair of adjacent flat surfaces (36) and having an outer, inclined conical surface (33).

3. The automotive vehicle wheel defined by claim 1, wherein a central plane of each of said intermediate regions (27, 51) of said main disk and said second disk and said axis of rotation (O-O) of said main disk and said second disk, define a three dimensional truss of substantially triangular cross-section.

4. An automotive vehicle wheel of light alloy including a main disk (21) and a second disk (22) having bosses (25, 46) respectively for attachment to a hub (26) of an axle, peripheral edges (23, 42) for attachment to a rim (R) of the wheel, and means (43) for securing said peripheral edges (23, 42) to the rim (R);

vent holes (28, 52) formed in intermediate regions (27, 51) between the bosses (25, 46) and the peripheral edges (23, 42) of the main disk (21) and the second disk (22), respectively, and an adapter plate (A) for attaching said main disk (21) and said second disk (22) to the hub (26) for rotation as a unit about an axis of rotation (O-O), wherein the improvement comprises:

an adapter plate having one surface formed with a plurality of radially extending flat surfaces (36) and a plurality of projections (31) with each projection (31) located between a pair of adjacent flat surfaces (36) and having an outer, inclined conical surface (33), a plurality of holes (37) provided for attaching said adapter plate to an axle hub (26) with each of said holes (37) located in one of said flat surfaces (36) and extending normal to said one flat surface (36) to receive a plurality of screw clamping devices (30) extending parallel with said axis of rotation (O-O), a plurality of threaded holes (35) provided to said adapter plate for attaching said main disk and said second disk with each of said threaded holes (35) located in one of said outer, inclined conical surfaces (33) and extending normal to said conical surface, said boss (25) of said main disk (21) being formed with opposed conical surfaces (39, 48) having the same conical angle as the inclined conical surfaces (33), said boss (46) of said second disk (22) being formed with a conical surface (49) having the same conical angle as the inclined conical surfaces (33), a plurality of holes (40, 47) are formed through said conical surfaces (39, 48) of said boss (25) and said conical surface (49) of said boss (46), said boss (46) of said second disk (22) is superposed on said boss (25) of said main disk (21) with said conical surface (49) abutting said conical surface (48), said boss (25) of said main disk (21) is superposed on said adapter plate (A) with said conical surface (39) abutting said inclined conical surfaces (33), a second plurality of screw clamping devices (34) extend through said holes (40, 47) and are secured in said threaded holes (35) to attach said bosses (25, 46) of said main disk (21) and said second disk (22) to said adapter plate (A) with a extension of the respective axis (P-P) of each clamping device (34) intersecting said axis of rotation (O-O) at an angle ($\theta$) and with heads (50) of said clamping devices (34) directed toward said axis of rotation (O-O), and a central plane of each of said intermediate regions (27, 51) of said main disk and said second disk and said axis of rotation (O-O) of said main disk and said second disk, define a three dimensional truss of substantially triangular cross-section.

* * * * *